Jan. 10, 1950

F. C. WILLIAMS 2,494,076

LINEAR COORDINATE TRANSFER COMPUTING
METHOD AND DEVICE

Filed July 25, 1946

FRANKLIN C. WILLIAMS
INVENTOR

ATTORNEYS

Patented Jan. 10, 1950

2,494,076

UNITED STATES PATENT OFFICE 2,494,076

LINEAR COORDINATE TRANSFER COMPUTING METHOD AND DEVICE

Franklin C. Williams, Rochester, N. Y., assignor to Eastman Kodak Company, Rochester, N. Y., a corporation of New Jersey Application July 25, 1946, Serial No. 686,171

2 Claims. (Cl. 235—61)

This invention relates to the electrical determination of the sum of several products and more particularly to a simple linear coordinate transfer computing method and device.

Figure 1:
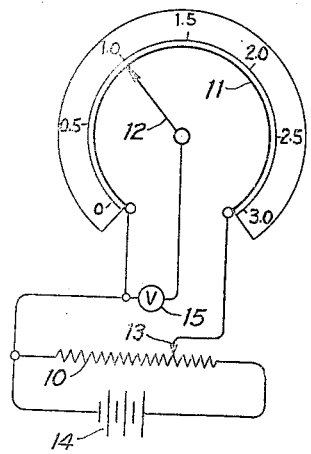
Figure 2:
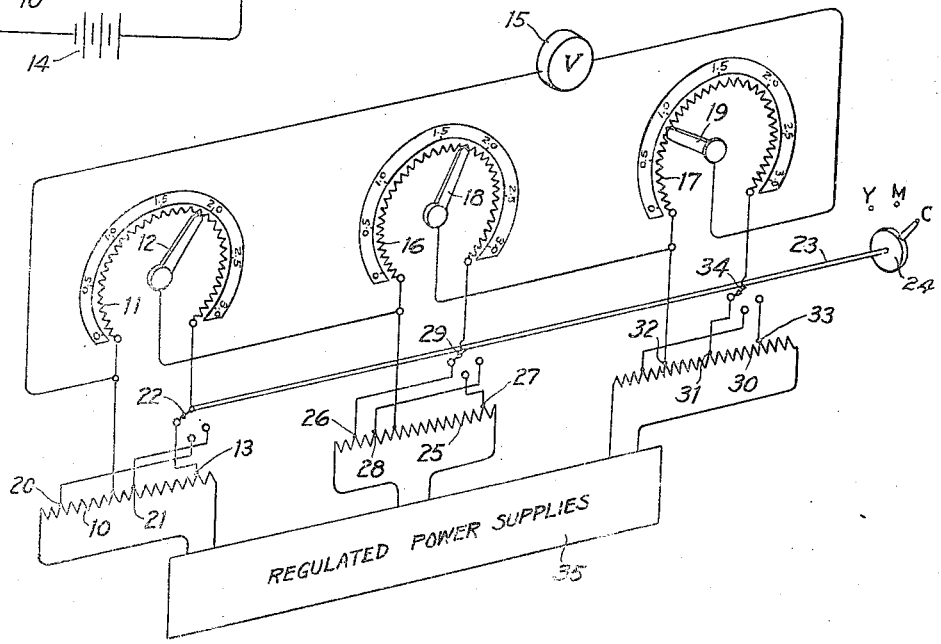

Whenever it is necessary to make a large number of linear transfers between two related sets of two or more related coordinates, the manual labor involved is considerable and, of course, subject to occasional error. The primary object of the present invention is to provide a method and apparatus whereby such computations may be made electrically and the answer read directly. Other objects and advantages of the invention will become apparent from the following description when read in connection with the accompanying drawing in which:

Fig. 1 is a wiring diagram showing a simple device illustrating the principle of the invention; and Fig. 2 is a wiring diagram of an arrangement permitting determinations to be made in rapid succession.

One field in which the invention finds great usefulness is in specifying the sensitometric characteristics of subtractive process color film where it is desirable to determine the three individual dye densities from measurements made of the entire composite three-dye image and the invention will be described as applied in this field.

If the density of a composite three-dye image to each of three essentially monochromatic radiations, usually of red, green and blue light, is measured, data is obtained from which the equivalent density of each individual dye may be computed. The computation is a linear three-dimensional coordinate transfer and in accordance with the invention is done electrically.

Each of the three measurable densities to the above-mentioned monochromatic radiations is the sum of contributions of all three dyes. From known characteristics of these dyes individually, equations can be derived expressing the individual components in terms of the measurements of the whole and may be expressed as $$C = aD_r + bD_g + cD_b$$
$$M = a'D_r + b'D_g + c'D_b$$
$$Y = a''D_r + b''D_g + c''D_b$$

where $D_r$, $D_g$, and $D_b$ are the densities of the whole image to the three radiations and $a$, $b$, etc. are constants pertaining to one particular set of dyes and the density units employed. This is a coordinate transfer system from the coordinate set $D_r$, $D_g$ and $D_b$ to the linearly related set $C$, $M$ and $Y$. Thus each of these equations expresses one desired quantity in terms of three directly measurable quantities.

These equations are solved electrically by setting up potentials corresponding to the constants pertaining to the dyes involved, dividing these potentials by factors representing the densities and noting the resulting combined potential. This resulting potential may be numerically equal, in volts, to the desired quantity in density.

Referring to Fig. 1, there is shown a potentiometer 10 connected across the terminals of a linearly-wound potential divider 11, such as a linear radio volume control, having a sliding contact arm 12, the high voltage end of the divider 11 being connected to an adjustable contact 13 on the potentiometer 10. Voltage is supplied to the potentiometer 10 from any suitable source such as a battery 14. A high impedance voltmeter 15, which may be a vacuum-tube voltmeter, is connected between the zero-end terminal of the divider 11 and its contact arm 12 to indicate the resulting voltage.

The principle of the invention will become clear if it is assumed that the equation to be solved is simply $C = aD_r$. First calibrate by setting the contact arm 12 at 1.0, as shown, and adjust the contact 13 until the voltmeter reads "$a$" volts. Now if the contact arm 12 is set at any value of $D_r$, the voltmeter 15 will read directly $C = aD_r$. Now if three entirely independent devices such as shown in Fig. 1 are adjusted to yield voltages equal to $aD_r$, $bD_g$, and $cD_b$ and connected in series, the voltage sum as read by the voltmeter will be $$C = aD_r + bD_g + cD_b$$

Such a series arrangement is shown in Fig. 2. If $b$ or $c$ is negative, the polarity of the applied potential can be reversed.

The arrangement shown in Fig. 2 in addition provides for rapid shifting from determination of $C$ to the determination of $M$ and then $Y$. This is possible because all that is needed for the shift is to change the potentials to correspond to $a'$, $b'$, and $c'$ and then to $a''$, $b''$, and $c''$ and the same potentiometers can be used since the different potentials are not required at the same time. Thus as shown in Fig. 2 the potential divider 11 is connected in series with additional potential dividers 16 and 17 having contact arms 18 and 19, respectively, for setting up the values for $D_g$ and $D_b$. Also, the potentiometer 10 is provided with additional taps 20 and 21 corresponding to $a'$ and $a''$, respectively, which are selectively connectable to the divider 11 by means of a switch 22 carried by a shaft 23 having a control knob 24. Similarly, the divider 16 has a supply potentiometer 25 having three taps 26, 27, and 28 corresponding to the coefficients $b$, $b'$, and $b''$, respectively, which are selectively connectable to the divider 16 by a switch 29 carried by the shaft 23. In the same manner, a third potentiometer 30 has three taps 31, 32, and 33 representing the coefficients $c$, $c'$, and $c''$, respectively, and adapted to be connected to the divider 17 by a selecting switch 34 carried by the shaft 23.

Although the several taps to the potentiometers 10, 25, and 30 may be adjustable to set up the proper coefficients when a different set of dyes is involved, it is preferred for the sake of accuracy to have the taps fixed and use a different set of potentiometers for each set of dyes. This requires a predetermined voltage across the potentiometers and it may be obtained by test, but preferably a set of regulated voltage power supplies 35 is employed.

With the device above described, the density readings of a composite color image to red, green, and blue light are set up on the dividers 11, 16, and 17 and the equivalent densities C, M, and Y read on the voltmeter 15 in rapid succession by suitable manipulation of the knob 24.

While a specific device has been described in detail to disclose the invention, it will be readily apparent to those skilled in the art that many modifications will suggest themselves and all such modifications are intended to be included within the scope of the appended claims.

I claim:

1. The method of determining the equivalent density of a dye in a composite three-dye subtractive image which comprises setting up three electric potentials corresponding respectively to the transmission characteristics of the three subtractive dyes, dividing each such potential by a factor representing the density of the composite image to light complemental in color to the respective dyes to provide electric potentials representative of the products of said transmission characteristic times the respective density factors, and measuring the algebraic sum of the potentials so provided.

2. In a device for determining the equivalent density of each of the dyes in a composite three-dye subtractive image from the density of the composite image to each of three substantially monochromatic radiations complemental in color to the three dyes, the coefficients of each of the three dyes to each of the three radiations being known, three voltage dividers in serial relationship each adjustable to correspond to the density of the image to a different one of the three radiations, each of the voltage dividers having an associated potentiometer provided with three fixed taps corresponding respectively to the three coefficients of the three dyes to the same different one of the three radiations, switching means for selectively connecting to the dividers the taps of the potentiometers corresponding to the coefficients of any one of the three dyes, and means for indicating the total voltage across the three dividers.

FRANKLIN C. WILLIAMS.

REFERENCES CITED

The following references are of record in the file of this patent:

UNITED STATES PATENTS

| Number | Name | Date |
|---|---|---|
| 2,244,369 | Martin | June 3, 1941 |
| 2,401,779 | Swartzel, Jr. | June 11, 1946 |
| 2,417,098 | Wilcox | Mar. 11, 1947 |

FOREIGN PATENTS

| Number | Country | Date |
|---|---|---|
| 108,808 | Sweden | Oct. 19, 1943 |